UNITED STATES PATENT OFFICE.

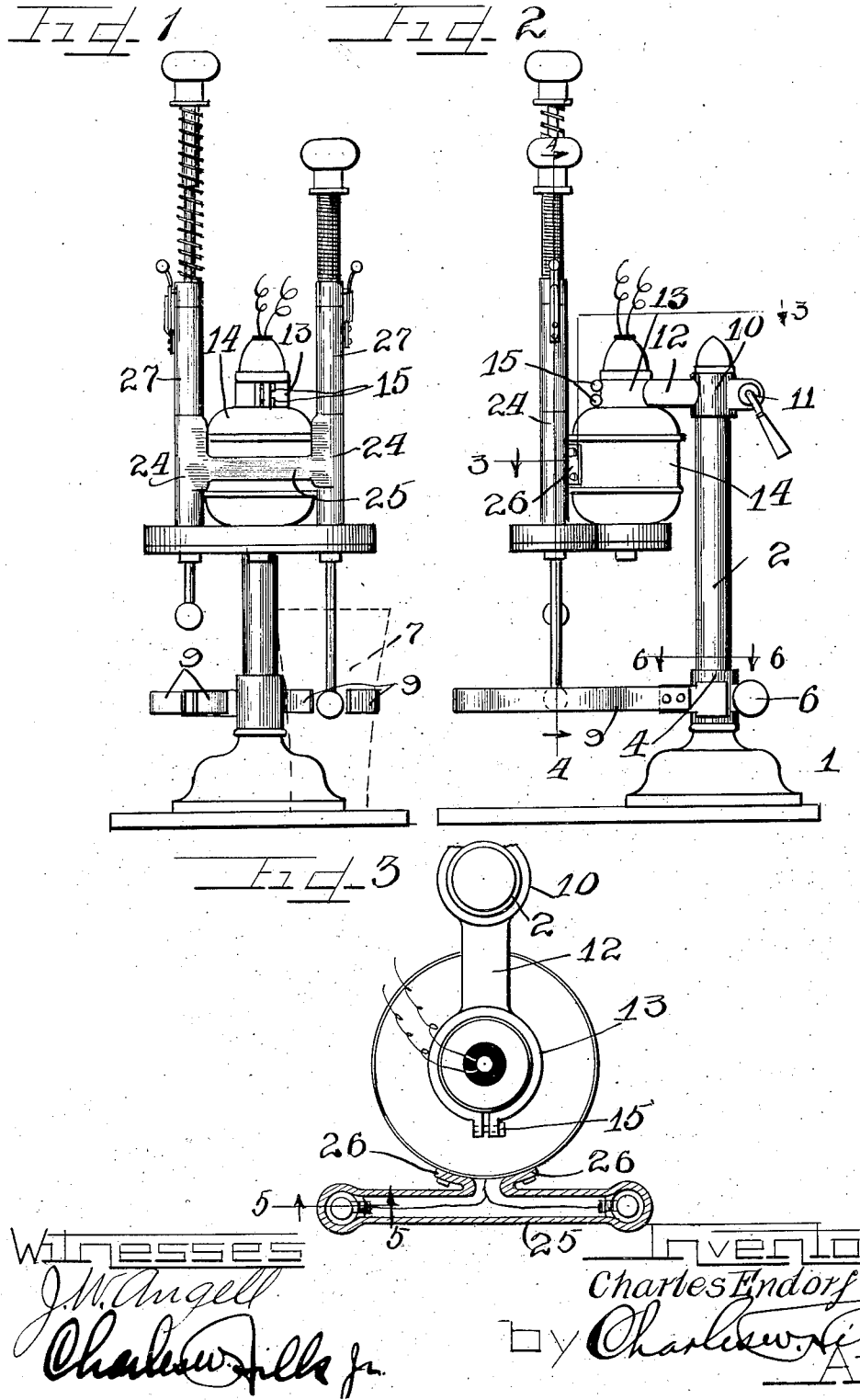

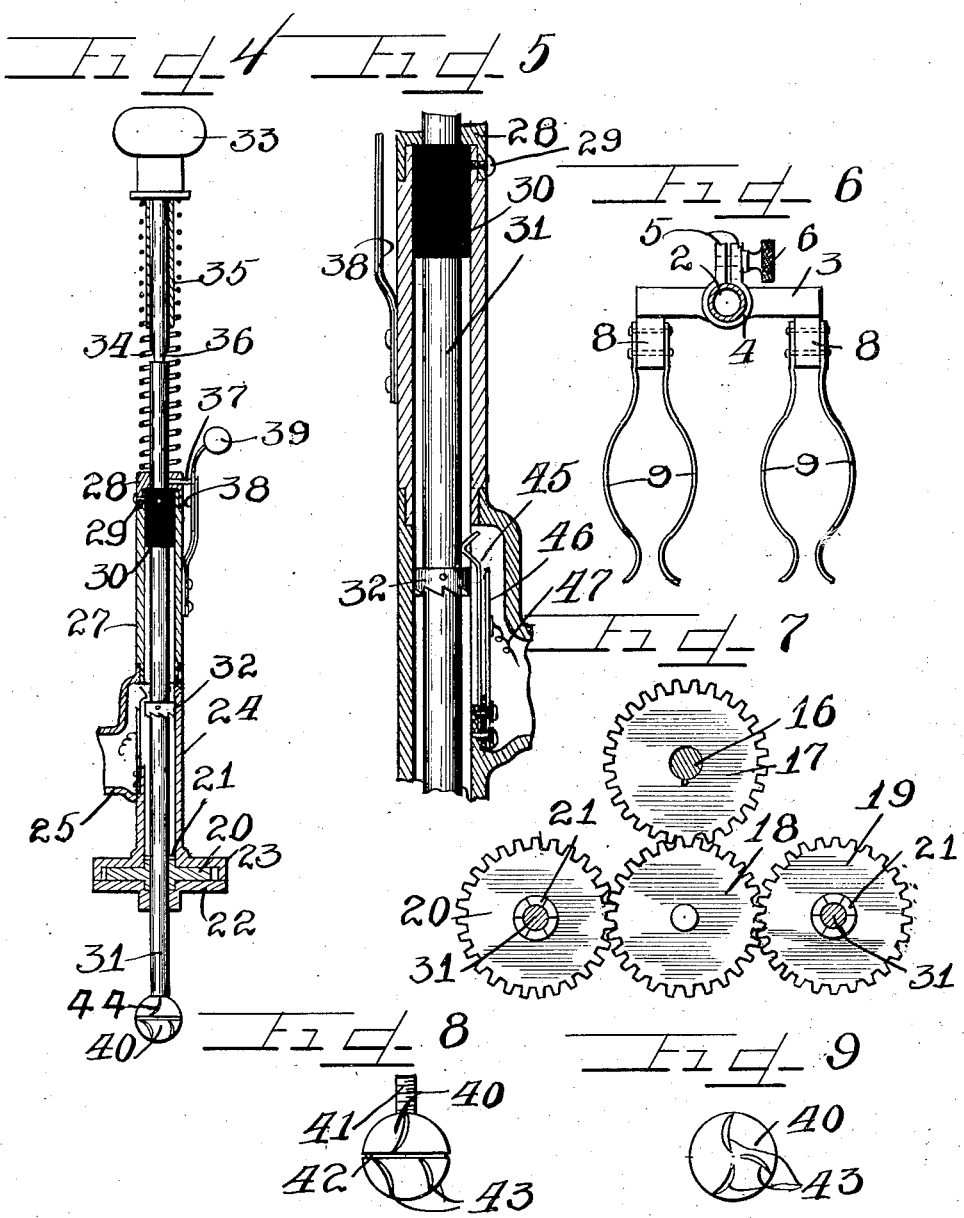

CHARLES ENDORF, JR., OF CHICAGO, ILLINOIS, ASSIGNOR TO LINSTROM, SMITH CO., A CORPORATION OF ILLINOIS.

MIXER.

1,068,994.      Specification of Letters Patent.      Patented July 29, 1913.

Application filed June 24, 1912. Serial No. 705,449.

*To all whom it may concern:*

Be it known that I, CHARLES ENDORF, Jr., a citizen of the United States, and a resident of the city of Chicago, in the county of Cook and State of Illinois, have invented certain new and useful Improvements in Mixers; and I do hereby declare that the following is a full, clear, and exact description of the same, reference being had to the accompanying drawings, and to the numbers of reference marked thereon, which form a part of this specification.

This invention relates to that class of mixing devices adapted for use in stirring, agitating and mixing liquids; for example, in the preparation of beverages and the like. Many devices of the kind have heretofore been constructed, most of which have been complicated in construction and therefore expensive to maintain, and when motor driven have usually consumed considerable current for the work performed.

The object of this invention is to afford an exceedingly simple and practical device of the class described, wherein a single motor may be used to operate one, or a battery, of any desired number of said devices in a manner to permit any of the same to be operated without the necessity of bringing the remaining mixing devices into operation.

It is also an object of the invention to afford means whereby the current is automatically cut off by the return of the mixing means to normal after each operation, and cut in when the mixing means are brought into operative position.

It is also an object of the invention to afford an improved mixing head adapted to produce rapid circulation and movement in the liquid, and affording a central, downward vortex therein to thoroughly mix the same.

The invention (in its preferred form) is illustrated in the drawings, and hereinafter more fully described.

In the drawings: Figure 1 is a front elevation of a device embodying my invention, having two mixing heads thereon. Fig. 2 is a side elevation thereof. Fig. 3 is a section on line 3—3 of Fig. 2. Fig. 4 is an enlarged, longitudinal section taken on line 4—4 of Fig. 2, showing the shaft in raised position. Fig. 5 is a section on line 5—5 of Fig. 3. Fig. 6 is a reduced section on line 6—6 of Fig. 2. Fig. 7 is a top plan view of the gear train, with other parts removed. Fig. 8 is a side elevation of the mixing head showing the same removed from the shaft. Fig. 9 is a bottom plan view thereof.

As shown in the drawings: 1, indicates a suitable weighted base, having an upright standard 2, mounted thereon and extending a suitable height above the same. Secured on said standard 2, is a transverse bar 3, of any desired length, and having a central sleeve or collar 4, therein to receive said standard 2, said collar having rearwardly directed parallel arms 5, engaged by a clamping set screw 6, to permit said bar to be adjusted vertically on the standard 2, to suit the height of one of the glasses 7, shown in dotted lines in Fig. 1. On the forward side of said standard are forwardly projecting arms 8, on opposite sides of which are secured spring clamps 9, adapted to engage the glass 7, therebetween, as shown in Fig. 1. Slidably secured on said standard 2, is a split sleeve 10, having a clamping member or levered set screw 11, engaged therein to rigidly engage the same upon the standard, as shown in Fig. 2. Secured on the forward side of said sleeve, is an arm 12, having at its extremity a split clamping collar 13, to receive therein a part of the casing 14, of an electric motor, and to rigidly engage and support the same, clamping bolts 15, engaging through the split ends of said collar for that purpose.

Secured on the lower end of the shaft 16, of the motor, is a spur gear 17, and meshing therewith at the forward side of the machine, is a similar spur gear 18, and disposed on each side thereof, are spur gears 19 and 20, any number of which may be employed, dependent upon the number of mixing heads to be employed in the battery. Each of the laterally disposed gears 19 and 20, is provided with an upwardly directed hub, provided with upwardly projecting ratchet teeth 21. A gear casing comprising a lower, flat, suitably shaped plate 22, and an upper and downwardly flanged complemental plate 23, incloses all of said gears and at each side of the motor is provided with upwardly extending sleeves 24, concentric with the bore through the spur gears 19 and 20, and connecting the same is a transverse tubular bar 25, provided on its inner side with central and laterally disposed flanges 26, shaped to fit and to be rigidly attached to the motor casing, and affording a passage therefrom for the leads to the motor. Mounted upon said sleeves 24, and extending upwardly for a desired height, is a sleeve 27, having a centrally apertured cap 28, thereon, provided with set screws 29, which engage the same in place upon the sleeve 27. An insulating sleeve 30, is slidably engaged in the sleeve 27. Extending through said insulating sleeve 30, (which is rigidly secured thereto and through the spur gear 20 or 19, as the case may be) is a shaft 31. Secured on said shaft in the sleeve 24, is a downwardly facing clutch member 32, complemental with the hub clutch on the corresponding gear and adapted to engage therewith to rotate the shaft thereby. Said shaft is of a length to extend the desired distance above the cap 28. Secured on the upper end of said shaft, is a hand piece or button 33, for manual engagement, and bearing at one end against said cap piece 28, and at the other beneath said hand piece, 33, is a spiral pushing spring 34, through which said shaft extends axially, and which acts normally to hold the shafts elevated, as shown in Fig. 4. Secured also on said shaft, and extending from said hand piece downwardly, is a sleeve 35, of suitable length to limit the downward movement of the shaft (by engagement on the cap piece) just sufficient to engage the clutch. As shown, a spring clutch is provided to hold the shaft in engagement with the before mentioned clutch when in operative position. For this purpose, the shaft 31, is provided with a peripheral groove affording an upwardly facing shoulder 36, at a point adapted to lie just within the cap piece 28, when the aforesaid clutches are in driving position, and a pin 37, transversely slidable through said cap piece, engages therein to hold the shaft in driving position until released. The outer end of said pin or bolt is secured to a leaf spring 38, provided with a lever 39, for manual engagement to permit retraction thereof. Secured on the lower end of each of said shafts 31, is a mixing head. This, as shown, comprises a round or substantially ball shaped head portion 40, and a stem 41, which may be threaded for engagement on said shaft, though, of course, the head may be engaged therein in any suitable manner. Said head is provided circumferentially and horizontally with a groove 42, and below said groove with downwardly converging obliquely arranged grooves 43, which may be of any desired number, and which serve while rotating, to produce a downwardly acting vortex in the liquid. Above said circumferential groove are oppositely inclined grooves 44, which act to produce further agitation in the liquid and to produce an upwardly deflected current when the shaft is rotated.

Switches are provided to be operated by movement of said shafts or any of them, and acting to make the motor circuit when one of the shafts is forced downwardly to operative position, and to break the motor circuit when the shaft is returned to normal. For this purpose, as shown, each of the sleeves 24, is slotted to afford an opening into the tubular bar or connection 25, as shown in Figs. 4 and 5, and secured directly on said sleeve at the bottom of said slot, and projecting upwardly and inwardly into bearing against said shaft above the clutch member 32, is a leaf spring 45, bent inwardly, and V shaped at its upper and free end to afford an inclined contact face directed upwardly and also downwardly. Secured parallel (but out of contact) therewith, and insulated therefrom and from the sleeve, is a spring contact plate 46. Lead wires 47, are connected with said spring contact member 46, adjacent each of said shafts and lead inwardly to one of the binding posts for the motor to afford one of the motor leads, and one of the lead wires connecting with the source of electrical supply, is grounded at any convenient point on the machine.

The operation is as follows: The glass holding clamps may, of course, be adjusted as to height to suit any desired height of glass and this also is true of the machine as a whole, inasmuch as the motor and the parts attached therewith may be adjusted upwardly or downwardly on the standard 21, and rigidly secured in its adjusted position by means of the levered clamping element 11. When the machine is not in use the shafts are obviously at rest, inasmuch as the motor is out of circuit. When, however, it is desired to use the device for mixing purposes, it is only necessary to force the appropriate shaft downwardly against the tension of its spring with the effect of closing the switch just as the clutch engages to drive the shaft from said gear and simultaneously the pin clutch 37, engages over the shoulder 36, in said shaft and holds the shaft in operative position until manually released. The shaft is now rotated at a high rate of speed by the motor, the mixing head thereon producing a strong downward vortex in the liquid, and also a cross and slightly upward vortex to more thoroughly mix, and, to an extent, aerate the contents of the glass or container. When sufficiently mixed, the pin clutch is retracted by means of the lever 39, and the shaft is raised to normal position by the spring 34. As the insulated sleeve 30, is retracted from the leaf spring 45, the latter moves inwardly, breaking the circuit at the switch.

From the construction described it is evident that one, or as many mixing shafts as desired, may be operated simultaneously or independently, and that any one of which when actuated, serves to make or complete the motor circuit, to drive the machine, and all the shafts which are then in driving position, and that said drive of the motor will be continued so long as one of said shafts is at driving position, thereby assuring great economy in operation by relieving the operator of the necessity of throwing a switch manually and by consuming only so much power as may be required at any given time, or, in other words, varying the load upon the motor to the actual work to be performed as the work varies.

Of course, details of construction may be varied. While I have shown the device embodied with a plurality of mixing shafts, it is to be understood that one, or any desired number may be used. I have shown but one (and that a preferred) construction embodying my invention. I therefore do not purpose limiting the patent granted on this application otherwise than necessitated by the prior art.

I claim as my invention:

1. A device of the class described embracing a plurality of slidably mounted rotatable shafts, a motor, means operated from the motor for rotating any of said shafts when in operative position, and a switch controlling the motor circuit and operated by the sliding of one of said shafts, and acting to make the motor circuit when the shaft is at driving position, and to break the motor circuit when the shaft is in retracted position.

2. A device of the class described embracing supporting means, a motor adjustably mounted thereon, a holding device adjustably mounted thereon below the motor, shafts slidably and rotatably mounted to be driven singly and simultaneously by the motor, means holding said shafts normally retracted from driving position, a switch for each shaft and controlling the motor circuit to break the motor circuit when the shaft is retracted and to make the motor circuit when the shaft is at driving position, and a manually operated detent or clutch for releasing the shaft from driving position and simultaneously breaking the circuit.

3. In a mixing device a standard or column, a motor adjustably mounted thereon, one or more shafts slidably supported and journaled on the motor frame, and substantially parallel said column, a gear on the armature shaft, gears entrain therewith and through each of which one of said shafts slidably extends, a clutch member on each shaft, a complemental clutch member therefor on the corresponding gear to drive said shaft when in driving position, a spring normally supporting each shaft out of driving position, a manually releasable detent for each shaft to hold the same in adjusted driving position, and a switch for each shaft controlling the motor circuit acting to make the circuit when the shaft is depressed to driving position and to break the motor circuit when released therefrom.

4. In a device of the class described a motor, a battery of slidably mounted shafts, each and all adapted to be rotated by said motor when slid to driving position, means on each shaft for retracting the same from driving position, and a switch adjacent each shaft and controlling the motor circuit, and acting to make the motor circuit when the shaft is at driving position, and to break the motor circuit when released from driving position.

5. A device of the class described embracing a motor, a gear wheel driven thereby, other gears entrain therewith, an upwardly facing clutch hub on said gears, shafts slidably mounted in each of said gears, a clutch member thereon complemental with the corresponding hub clutch members, a mixing head secured on the extremity of each shaft, means on each shaft holding the same normally elevated out of mixing position, and a motor controlling switch mounted one at each shaft, and acting to make the motor circuit when its shaft is at mixing position, and to break the motor circuit when its shaft is released therefrom.

6. A mixing device of the class described embracing an adjustably supported motor, a battery of mixing shafts slidably supported on the motor frame and adapted to be driven by the motor, driving means for each shaft operated from the motor, and switches in the motor circuit, one mounted adjacent each shaft and acting to make the motor circuit drive the shaft when the shaft is adjusted to driving position, and to break the motor circuit when the shaft is released therefrom.

7. A device of the class described embracing a motor, a battery of shafts mounted to be driven thereby, and each adjustable to and from driving position, switches in the motor circuit, one arranged adjacent each shaft and acting to make the motor circuit when the shaft is adjusted to driving position, and to break the motor circuit when the shaft is released therefrom, and entrain driving means for all of said shafts, and entrain with the motor whereby one or any number of said shafts may be operated simultaneously or independently by the same motor.

8. A device of the class described comprising a standard, a motor frame rigidly but adjustably fixed thereon, a motor and driven gears mounted therein, sleeves secured on said frame, and mixing shafts slidable therein and adapted to be rotated by said gears when moved downward in said sleeves.

9. A device of the class described comprising motor driven gears, mixing shafts slidable therethrough, complementary clutch members on each adapted to cause said shafts to rotate with said gears, and electrical connections causing rotation of said gears adapted to be actuated by the sliding of said shafts.

10. A device of the class described comprising a frame, a motor thereon, a mixing shaft driven thereby and slidable relative thereto, and a switch for said motor operated by said shaft when moved downwardly.

11. In a device of the class described a motor driven rotatable shaft and a mixing head thereon having upwardly and downwardly directed recesses therein adapted to churn a fluid in such directions simultaneously.

12. In a device of the class described a mixing head comprising a spherical member having oppositely directed and converging recesses therein.

13. In a device of the class described a mixing head adapted to churn a liquid in an upward and downward direction simultaneously.

In testimony whereof I have hereunto subscribed my name in the presence of two subscribing witnesses.

CHARLES ENDORF, Jr.

Witnesses:
CHARLES W. HILLS, Jr.,
GEORGE R. MOORE.